(12) United States Patent
Madden

(10) Patent No.: US 8,893,003 B2
(45) Date of Patent: Nov. 18, 2014

(54) MULTI-MEDIA CENTER FOR COMPUTING SYSTEMS

(71) Applicant: Thomas Michael Madden, Sunnyvale, CA (US)

(72) Inventor: Thomas Michael Madden, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/677,004

(22) Filed: Nov. 14, 2012

(65) Prior Publication Data

US 2013/0167032 A1   Jun. 27, 2013

Related U.S. Application Data

(63) Continuation of application No. 12/778,038, filed on May 11, 2010, now abandoned, which is a continuation of application No. 11/247,975, filed on Oct. 10, 2005, now Pat. No. 7,721,208.

(60) Provisional application No. 60/724,622, filed on Oct. 7, 2005.

(51) Int. Cl.
  *G06F 3/00* (2006.01)
  *G06F 9/44* (2006.01)
  *G06F 3/01* (2006.01)

(52) U.S. Cl.
  CPC ............... *G06F 9/4443* (2013.01); *G06F 3/01* (2013.01)
  USPC ........................... 715/716; 715/790; 715/802

(58) Field of Classification Search
  CPC .......................... H04N 5/44543; G06F 3/0481
  USPC ......................................... 715/716, 790, 802
  See application file for complete search history.

(56) References Cited

U.S. PATENT DOCUMENTS

| | | | |
|---|---|---|---|
| 4,847,781 A | 7/1989 | Brown, III et al. | |
| 5,555,354 A | 9/1996 | Strasnick et al. | |
| 5,706,334 A * | 1/1998 | Balk et al. ................. | 379/88.13 |
| 5,835,094 A | 11/1998 | Ermel et al. | |
| 5,838,326 A | 11/1998 | Card et al. | |
| 6,005,601 A | 12/1999 | Ohkura et al. | |
| 6,064,380 A | 5/2000 | Swenson et al. | |
| 6,088,032 A | 7/2000 | Mackinlay | |
| 6,201,540 B1 | 3/2001 | Gallup et al. | |
| 6,236,398 B1 | 5/2001 | Kojima et al. | |

(Continued)

OTHER PUBLICATIONS

U.S. Appl. No. 11/249,032, Appeal Decision mailed Sep. 13, 2013, 13 pgs.

(Continued)

*Primary Examiner* — Tuyetlien Tran
(74) *Attorney, Agent, or Firm* — Schwegman Lundberg & Woessner, P.A.

(57) ABSTRACT

Various "media-components" are provided in a "multi-media center." In modular architecture, a module-controller communicates with media-modules provided for various media-components. A media-module can include or obtain data pertaining to a particular media-component, identify media-player(s), and access information related to their media. However, the media-modules are isolated from each other, and the module-controller effectively controls output generated in response to user input. A user interface library is provided for the media-modules. Media-modules can obtain a template or other tools from the library and construct their user interface (e.g., menus). Media-modules can also identify a media-player that can be initiated in response to user input. Subsequently, the media-controller forwards user input to the media-player.

22 Claims, 6 Drawing Sheets

(56) References Cited

U.S. PATENT DOCUMENTS

| | | | |
|---|---|---|---|
| 6,262,724 | B1 | 7/2001 | Crow et al. |
| 6,295,062 | B1 | 9/2001 | Tada |
| 6,448,987 | B1 | 9/2002 | Easty et al. |
| 6,654,030 | B1 | 11/2003 | Hui |
| 6,868,225 | B1 | 3/2005 | Brown et al. |
| 6,876,729 | B1 | 4/2005 | Kuter et al. |
| 6,889,001 | B1 | 5/2005 | Nikaido et al. |
| 6,914,551 | B2 | 7/2005 | Vidal |
| 6,990,671 | B1 | 1/2006 | Evans et al. |
| 7,032,177 | B2 | 4/2006 | Novak et al. |
| 7,096,431 | B2 | 8/2006 | Tambata et al. |
| 7,205,471 | B2 | 4/2007 | Looney et al. |
| 7,581,182 | B1* | 8/2009 | Herz .............................. 715/713 |
| 7,721,208 | B2 | 5/2010 | Madden |
| 7,966,577 | B2 | 6/2011 | Chaudhri et al. |
| 8,621,393 | B2 | 12/2013 | Chaudhri et al. |
| 2001/0050690 | A1 | 12/2001 | Giles et al. |
| 2002/0091662 | A1 | 7/2002 | Bogia |
| 2002/0196266 | A1 | 12/2002 | Mou et al. |
| 2003/0016951 | A1 | 1/2003 | Jakel et al. |
| 2004/0047588 | A1 | 3/2004 | Okada et al. |
| 2004/0056837 | A1 | 3/2004 | Koga et al. |
| 2004/0080537 | A1 | 4/2004 | Adler |
| 2004/0155907 | A1 | 8/2004 | Yamaguchi |
| 2004/0162845 | A1 | 8/2004 | Kim et al. |
| 2004/0223737 | A1 | 11/2004 | Johnson |
| 2005/0027539 | A1 | 2/2005 | Weber et al. |
| 2005/0060666 | A1 | 3/2005 | Hoshino |
| 2005/0132055 | A1 | 6/2005 | Neogi |
| 2005/0138664 | A1 | 6/2005 | Neogi |
| 2005/0155077 | A1 | 7/2005 | Lawrence et al. |
| 2005/0198574 | A1 | 9/2005 | Lamkin et al. |
| 2006/0001645 | A1 | 1/2006 | Drucker et al. |
| 2006/0025920 | A1 | 2/2006 | Nezu |
| 2006/0036959 | A1 | 2/2006 | Heatherly et al. |
| 2006/0059426 | A1 | 3/2006 | Ogikubo |
| 2006/0064720 | A1 | 3/2006 | Istvan et al. |
| 2006/0095865 | A1 | 5/2006 | Rostom |
| 2006/0143327 | A1 | 6/2006 | Hsieh et al. |
| 2006/0156246 | A1 | 7/2006 | Williams et al. |
| 2006/0206428 | A1 | 9/2006 | Vidos et al. |
| 2006/0206779 | A1 | 9/2006 | Wehn et al. |
| 2006/0206799 | A1 | 9/2006 | Vidos et al. |
| 2007/0006093 | A1* | 1/2007 | Day et al. ....................... 715/781 |
| 2007/0016860 | A1 | 1/2007 | Lim et al. |
| 2007/0028267 | A1 | 2/2007 | Ostojic et al. |
| 2007/0070066 | A1 | 3/2007 | Bakhash |
| 2007/0080823 | A1 | 4/2007 | Fu et al. |
| 2007/0083616 | A1 | 4/2007 | Madden et al. |
| 2007/0083911 | A1 | 4/2007 | Madden et al. |
| 2007/0101364 | A1 | 5/2007 | Morita |
| 2007/0157095 | A1 | 7/2007 | Bilow et al. |
| 2007/0169115 | A1 | 7/2007 | Ko |
| 2007/0189737 | A1 | 8/2007 | Chaudhri et al. |
| 2010/0223553 | A1 | 9/2010 | Madden |
| 2011/0243525 | A1 | 10/2011 | Chaudhri et al. |
| 2014/0108998 | A1 | 4/2014 | Chaudhri et al. |

OTHER PUBLICATIONS

U.S. Appl. No. 13/134,245, Notice of Allowance mailed Aug. 29, 2013, 8 pgs.

U.S. Appl. No. 11/247,975, Final Office Action mailed Jul. 31, 2009, 16 pgs.

U.S. Appl. No. 11/247,975, Final Office Action mailed Sep. 16, 2008, 14 pgs.

U.S. Appl. No. 11/247,975, Non Final Office Action mailed Feb. 10, 2009, 15 pgs.

U.S. Appl. No. 11/247,975, Non Final Office Action mailed Mar. 20, 2008, 17 pgs.

U.S. Appl. No. 11/247,975, Notice of Allowance mailed Jan. 7, 2010, 12 pgs.

U.S. Appl. No. 11/247,975, Advisory Action mailed Oct. 14, 2009, 3 pgs.

U.S. Appl. No. 11/247,975, Advisory Action mailed Nov. 25, 2008, 3 pgs.

U.S. Appl. No. 11/247,975, Preliminary Amendment filed Jan. 17, 2006, 3 pgs.

U.S. Appl. No. 11/247,975, Response filed May 11, 2009 to Non Final Office Action mailed Feb. 10, 2009, 13 pgs.

U.S. Appl. No. 11/247,975, Response filed Jun. 17, 2008 to Non Final Office Action mailed Mar. 20, 2008, 15 pgs.

U.S. Appl. No. 11/247,975, Response filed Sep. 30, 2009 to Final Office Action mailed Jul. 31, 2009, 12 pgs.

U.S. Appl. No. 11/247,975, Response filed Oct. 30, 2009 to Office Action mailed Jul. 31, 2009 and Advisory Action mailed Oct. 14, 2009, 13 pgs.

U.S. Appl. No. 11/247,975, Response filed Nov. 14, 2008 to Final Office Action mailed Sep. 16, 2008, 13 pgs.

U.S. Appl. No. 11/249,032, Appeal Brief filed Sep. 20, 2010, 39 pgs.

U.S. Appl. No. 11/249,032, Decision on Pre-Appeal Brief Request mailed Aug. 19, 2010, 2 pgs.

U.S. Appl. No. 11/249,032, Examiner Interview Summary mailed Jul. 14, 2009, 2 pgs.

U.S. Appl. No. 11/249,032, Examiner's Answer to Appeal Brief mailed Dec. 8, 2010, 35 pgs.

U.S. Appl. No. 11/249,032, Final Office Action mailed Apr. 1, 2010, 21 pgs.

U.S. Appl. No. 11/249,032, Final Office Action mailed May 12, 2009, 19 pgs.

U.S. Appl. No. 11/249,032, Non Final Office Action mailed Oct. 1, 2008, 17 pgs.

U.S. Appl. No. 11/249,032, Non Final Office Action mailed Oct. 14, 2009, 19 pgs.

U.S. Appl. No. 11/249,032, Preliminary Amendment filed May 5, 2006, 7 pgs.

U.S. Appl. No. 11/249,032, Reply Brief filed Feb. 8, 2011, 15 pgs.

U.S. Appl. No. 11/249,032, Response filed Jan. 2, 2009 to Non Final Office Action mailed Oct. 1, 2008, 19 pgs.

U.S. Appl. No. 11/249,032, Response filed Jan. 14, 2010 to Non Final Office Action mailed Oct. 14, 2009, 12 pgs.

U.S. Appl. No. 11/249,032, Response filed Jul. 31, 2009 to Final Office Action mailed May 12, 2009, 12 pgs.

U.S. Appl. No. 11/249,139, 312 Amendment filed Apr. 26, 2011, 8 pgs.

U.S. Appl. No. 11/249,139, Final Office Action mailed Oct. 27, 2010, 11 pgs.

U.S. Appl. No. 11/249,139, Non Final Office Action mailed Jul. 16, 2010, 9 pgs.

U.S. Appl. No. 11/249,139, Notice of Allowance mailed Feb. 18, 2011, 12 pgs.

U.S. Appl. No. 11/249,139, Preliminary Amendment filed Jun. 12, 2006, 8 pgs.

U.S. Appl. No. 11/249,139, PTO Response to 312 Communication mailed Apr. 29, 2011, 2 pgs.

U.S. Appl. No. 11/249,139, Response filed Jan. 27, 2011 to Final Office Action mailed Oct. 27, 2010, 11 pgs.

U.S. Appl. No. 11/249,139, Response filed May 13, 2010 to Restriction Requirement mailed Apr. 13, 2010, 1 pg.

U.S. Appl. No. 11/249,139, Response filed Oct. 18, 2010 to Non Final Office Action mailed Jul. 16, 2010, 12 pgs.

U.S. Appl. No. 11/249,139, Restriction Requirement mailed Apr. 13, 2010, 5 pgs.

U.S. Appl. No. 12/778,038, Advisory Action mailed Sep. 4, 2012, 4 pgs.

U.S. Appl. No. 12/778,038, Final Office Action mailed May 14, 2012, 15 pgs.

U.S. Appl. No. 12/778,038, Non Final Office Action mailed Jan. 18, 2012, 15 pgs.

U.S. Appl. No. 12/778,038, Response filed Apr. 13, 2012 to Non Final Office Action mailed Jan. 18, 2012, 14 pgs.

U.S. Appl. No. 12/778,038, Response filed Aug. 24, 2012 to Final Office Action mailed May 14, 2012, 12 pgs.

U.S. Appl. No. 13/134,245, Examiner Interview Summary mailed Jun. 27, 2013, 3 pgs.

U.S. Appl. No. 13/134,245, Non Final Office Action mailed Mar. 13, 2013, 9 pgs.

(56) References Cited

OTHER PUBLICATIONS

U.S. Appl. No. 13/134,245, Response filed Jan. 7, 2013 to Restriction Requirement mailed Dec. 7, 2012, 6 pgs.
U.S. Appl. No. 13/134,245, Response filed Jun. 13, 2013 to Non-Final Office Action mailed Mar. 13, 2013, 13 pgs.
U.S. Appl. No. 13/134,245, Restriction Requirement mailed Dec. 7, 2012, 5 pgs.
"Application software", Wikipedia®, the free encyclopedia, [online]. Retrieved from the Internet: <URL: http://en.wikipedia.org/wiki/Application_software>, (May 22, 2006), 3 pgs.
"Digital audio", Wikipedia®, the free encyclopedia, [online]. Retrieved from the Internet: <URL: http://en.wikipedia.org/wiki/Digital audio>, (May 25, 2006), 3 pgs.
"Digital Media", Wikipedia®, the free encyclopedia, [online]. Retrieved from the Internet: <URL: http://en.wikipedia.org/wiki/Digital Media>, 2 pgs.
"Digital video", Wikipedia®, the free encyclopedia, [online]. Retrieved from the Internet: <URL: http://en.wikipedia.org/wiki/Digital video>, (May 6, 2006), 3 pgs.
"Doom9 What's on a DVD", [online]. Retrieved from the Internet: <URL: http://web.archive.org/web/20010428123010/ http://www.doom9.org/dvd-structure.htm>, (Apr. 28, 2001), 4 pgs.
"DVD Authoring Terminology", [online]. [archived Feb. 19, 2004]. Retrieved from the Internet: <URL: http://web.archive.org/web/20040219211732/http://www.mainfest-tech.com/links/dvd_terms.htm.>, (Feb. 19, 2004), 12 pgs.
"Express Remote (URM—17 A)", product information datasheet. (c) 2005 Keyspan, [online]. [retrieved on Sep. 25, 2005]. Retrieved from the Internet: <URL: http://www.keyspan:com/products/usb/urm15t>, (2005), 1-2.
"ITunes". Wikipedia®, the free encyclopedia, [online]. Retrieved from the Internet: <http://en,wikipedia.org/wiki/ITunes>, (May 22, 2006), 11 pgs.
"Keyspan Express Remote", Product Fact Sheet, Keyspan, (Sep. 25, 2005), 1 pg.
"Keyspan Express Remote Supports Apple's Airport Express", Press Release, Keyspan, (Nov. 10, 2004), 2 pgs.
"Keyspan: DMR Software v. 1.3 for Mac OS .X User Manual Rev. 04.09.01A", (1998), 50 pgs.
"Media player", Wikipedia®, the free encyclopedia, [online]. Retrieved from the Internet: <URL: http://en.wikipedia.org/wiki/Media_player>, (May 20, 2006), 1 pg.
"Microsoft® Windows® XP for Home Users Service Pack 2 Edition", Peachpit Press [online]. {retrieved Sep. 26, 2008]. Retrieved from the Internet: <URL: http://proquest.safaribooksonline.com/print?xmlid=0321369890/ch17lev1sec5>, (2008), 13 pgs.
"Multimedia". Wikipedia, the free encyclopedia, [online], Retrieved from the Internet: <http://en.wikipedia.org/wiki/Multimedia>, (May 25, 2006), 2 pgs.
"Remote for iTunes (URM-15T), product information datasheet", [online]. © 2005 Keyspan. [retrieved on Sep. 25, 2005]. Retrieved from the Internet: <URL: http://www.keyspan.com/product/usb/urm15t>, (2005), 1-2.
"Sailing Clicker 2.2.1", User Manual, © 2003-2005 Sailing Software AB, (2005), 45 pgs.
"Window XP Medial Center Edition, First released: Jan. 2002—Last released: Nov. 2004, an article summarizing the program is provided in lieu of the actual software itself.", [online]. [retrieved on Mar. 13, 2008]. Retrieved from the Internet: <URL: http://en.wikipedia.org/wiki/Windows_XP_Media_Center_Edition>, (Mar. 6, 2008), 5 pgs.
"Windows XP Media Center Edition", [online]. [retrieved Sep. 27, 2005]. Retrieved from Internet: <URL: http://en.wikipedia.org/wiki/Windows_XP_Media_Center_Edition>, (2005), 1-5.
Ralph, Labarge, *DVD Authoring & Production*, Focal Press, (2001), pp. 113, 252.
U.S. Appl. No. 11/249,032, Notice of Allowance mailed Feb. 19, 2014, 11 pgs.
U.S. Appl. No. 14/134,674, Non Final Office Action mailed Jan. 17, 2014, 6 pgs.
U.S. Appl. No. 14/134,674, Response filed Apr. 16, 2004 to Non Final Office Action mailed Jan. 17, 2014.
U.S. Appl. No. 13/134,245, Notice of Allowance mailed Nov. 4, 2013, 4 pgs.

* cited by examiner

MULTI-MEDIA CENTER FOR COMPUTING SYSTEMS

CROSS-REFERENCE TO RELATED APPLICATIONS

This application is a continuation of and claims the benefit of priority Under 35 U.S.C. 120 to U.S. patent application Ser. No. 12/778,038, filed on May 11, 2010, which is a continuation of and claims the benefit of priority Under 35 U.S.C. 120 to U.S. patent application Ser. No. 11/247,975, filed on Oct. 10, 2005, which in turn claims the benefit of priority Under 35 U.S.C. 119(e) to U.S. Provisional Patent Application No. 60/724,622, filed on Oct. 7, 2005, and entitled "MULTIMEDIA SYSTEM", the benefit of priority of each of which is claimed hereby, and each of which is incorporated by reference herein in its entirety.

This application is related to: (i) U.S. patent application Ser. No. 11/245,937, filed Oct. 7, 2005, and entitled "TECHNIQUES FOR PAIRING REMOTE CONTROLLERS WITH HOST DEVICES," which is hereby incorporated by reference herein; and (ii) U.S. Provisional Patent Application No. 60/725,544, filed Oct. 10, 2005, and entitled "MULTI-MEDIA CONTROL CENTER," which is hereby incorporated by reference herein.

BACKGROUND OF THE INVENTION

Today, virtually anything can be represented as digital data and presented in numerous forms including audible, visual, or audio-visual forms. Digital data can also be transported electronically, for example, as digital files or digital streams. Basically speaking, digital data can be stored as a "digital media" (e.g., a digital file, a media-player which stores digital data). Digital media (or "media") can be accessed by a variety of computing devices (e.g., personal computers, media-players, personal assistants, wireless phones). Typically, digital media includes at least digital content (or "content") that represents the actual content of information stored in a digital form. As such, digital content can, for example, be the content of a printed book, a picture, a song in audible form and/or in audio-visual forms (e.g., a rock video), movies, sports broadcasts, news in a variety of forms including text, audio, or audio-visual.

Digital media can be packaged with media-player(s) and/or other application programs. For example, Apple iPod media-player available from Apple Computers, Inc. combines a digital audio player and a portable hard drive for storing the media. iTunes or iPhoto, which are also available from Apple Computers, Inc, can be packaged with media-players and applications or tools that can be used for organization, searching and retrieval of media (e.g., organizing photo, obtaining lists of music or films from a database, and downloading music or films). Packaging digital media with media-players, tools, or other applications is a relatively recent development. Nevertheless, given the popularity of digital media, numerous forms of media and media-players have been developed and are in use today.

As digital data has become more prevalent, techniques for presenting digital data have become increasingly more useful.

SUMMARY OF THE INVENTION

The invention pertains to techniques for combining various "media-components" through use of a "multi-media center" which can be accessed via a central-user-interface.

The invention can be implemented in numerous ways, including a method, an apparatus, a computer readable medium, a computer system, or a signal embodied in a carrier wave. Several embodiments of the invention are discussed below.

As a method, implemented by a computing system, of providing a multi-media center that includes a plurality of media-components, one embodiment can, for example, include at least: configuring a plurality of media-modules for the multi-media center, wherein the plurality of media-modules represents a media-component in the multi-media-center, wherein each of the plurality of media-components includes at least one of digital media and an application program configured to access digital media; initiating a module-controller configured to communicate with each of the plurality of media-modules; receiving by the module-controller an input associated with the multi-media center; identifying at least one of the plurality of media-modules to generate a response to the input received by the module-controller; forwarding the input to the identified media-module; and receiving, at the module-controller, a response to the input as determined by the identified media-module.

As a computing system for providing a multi-media center that includes a plurality of media-components each including digital media, one embodiment can, for example, can include at least at least one processor; a plurality of media-modules, wherein the media-modules include a first media-module that can receive input and generate output; and a module-controller configured to communicate directly with each of the plurality of media-modules. The module-controller can further operate to: receive input associated with the multi-media center; forward the input to a first media-module; process and generate an output, by the first media-module, in response to the input; receive the output from the first media-module in response to the input; and perform at least one operation based on the output, where the at least one operation is controlled by the module-controller. The plurality of media-modules do not communicate with each other or with a multi-media center user and do not control the output.

As a computer readable medium including at least executable computer program modules stored therein for a multi-media center that includes a plurality of media-components, where each of the plurality of media-components includes digital data. The computer readable medium includes at least: computer program code for determining, based on a plurality of media-modules that each respectively represent at least one media-component, a central-user-interface that is used to access the plurality of media-components provided by the multi-media center; computer program code for receiving input associated with the central-user-interface; computer program code for determining whether to forward the input to one of the media-modules; and computer program code for forwarding the input to a first media-module of the plurality of media-modules when the determining determines to forward the input by one of the media-modules. The plurality of media-modules are isolated from each other and do not directly communicate with each other or with a multi-media center user, but communicate with a module-controller.

As a method, implemented by a computing system, of providing a multi-media center that includes a plurality of media-components which each includes digital data and program code to access the digital data, one embodiment of the invention can, for example, include at least: determining, based on a plurality of media-modules that each respectively represent at least one media-component, a central-user-interface that is used to access the plurality of media-components provided by the multi-media center; receiving input associated with the central-user-interface; determining whether to forward the input to one of the media-modules; and forwarding the input to a first media-module of the plurality of media-modules when the determining determines to forward the input by one of the media-modules. The plurality of media-modules are isolated from each other and do not directly communicate with each other or with a multi-media center user, but communicate with a module-controller.

As a computing system for providing a multi-media center that supports digital media, one embodiment can, for example, can include at least a plurality of media devices, where the media devices include a first media device that can receive input and generate output, and a centralized controller configured to communicate directly with each of the plurality of media devices. The centralized controller is configured to: receive input associated with the multi-media center; determine a first media device of the plurality of media device to receive the input; forward the input to the first media device; and process and generate an output, by the first media device, in response to the input.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
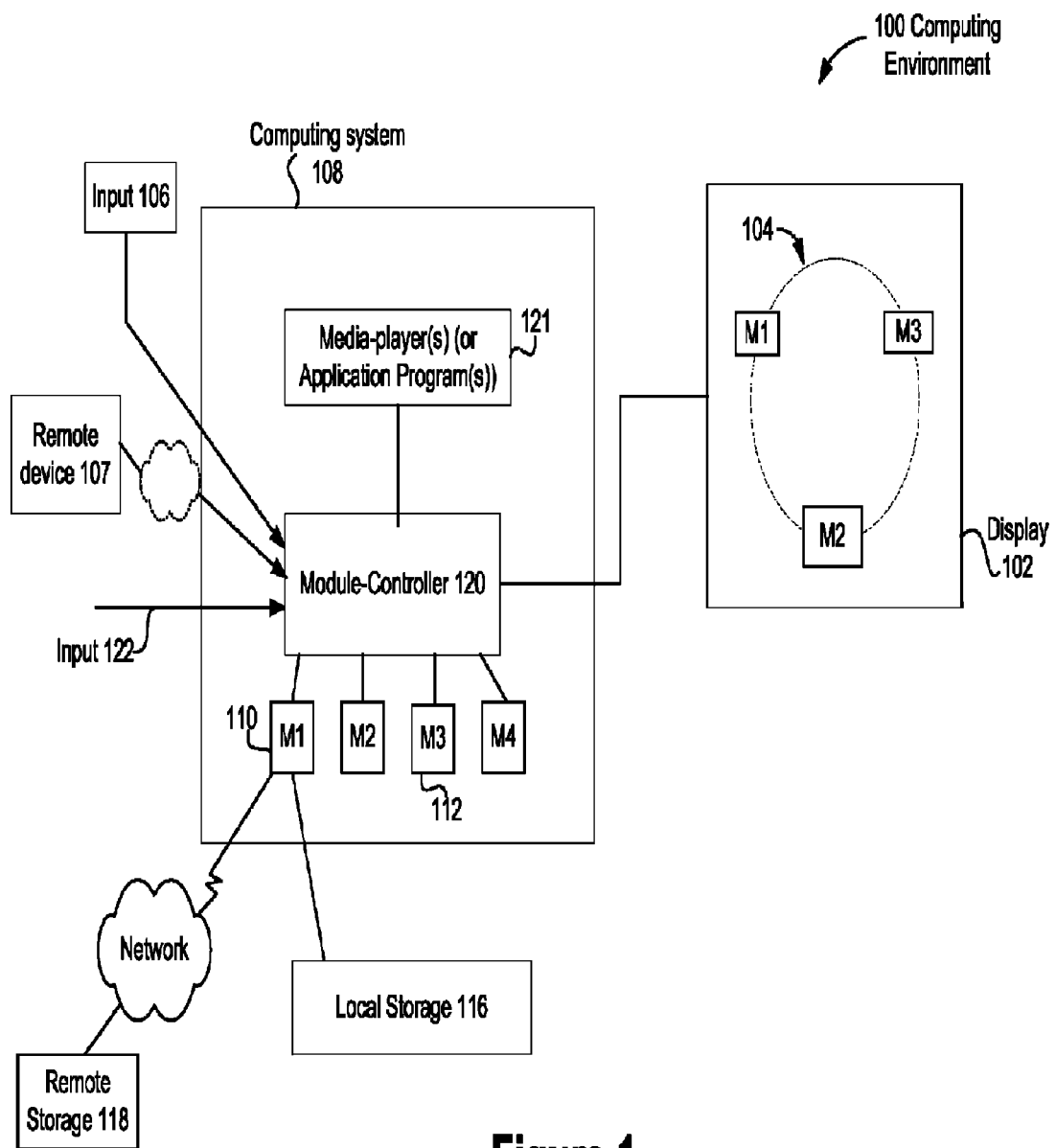
FIG. 1 depicts a computing environment capable of providing a multi-media-center in accordance of one embodiment of the invention.

As noted in the background section, techniques for presenting digital data have become increasingly more useful as digital media and media-players have become increasingly more popular and prevalent. Furthermore, given that many different forms of digital media and media-players have been developed and even more are likely to be developed soon, it is highly desirable to provide a "multi-media center" that can effectively combine various "media-components."

Accordingly, the invention pertains to techniques for combining various "media-components." In accordance with one aspect of the invention, various "media-components" are provided in a "multi-media center" which can be accessed via a central-user-interface. A "media-component" as used herein refers to digital media and/or application(s) used to access digital media. The "multi-media center" can, for example, be provided as a program on a computer system that includes one or more computers. The central-user-interface can graphically represent each media-component (e.g., as a selectable item in a main menu). User input can be entered, for example, by a keyboard and/or mouse connected to a computer system, or it can be entered remotely (e.g., wirelessly and/or over a network).

Another aspect of the invention provides a modular architecture that includes at least one media-module for each of the media-components configured for the multi-media-player. A media-module can include or obtain data pertaining to a particular media-component (e.g., user interface menus, lists of digital data in the media-component). In addition, a media-module can also identify media-player(s) and access information related to their media (e.g., music or movie lists). However, the media-modules do not directly control output. Instead, a module-controller communicates with various media-modules and effectively controls output generated in response to user input. The module-controller can forward the input to various media-modules for processing and receive output from them. Subsequently, the module-controller can use the output generated by the media-modules to perform the appropriate response (e.g., manipulate display of menus or presentation of media). In other words, the media-modules do not directly control the output of the multi-media center even though they may process the input and effectively generate the appropriate response. Furthermore, media-modules can be isolated from each other. As a result, the media-modules cannot communicate with each other, but can be added or removed dynamically as they do not affect each other or a main (base) program that effectively runs the multi-media center.

In one embodiment, each media-module includes or can obtain information needed to construct menus for its associated media-component. It should be noted that media-modules can construct their menus (or submenus) by using an User Interface Library (or library). More particularly, media-modules can obtain a template or other tools (e.g., metric utilities, windows, views, widgets, sounds) from the User Interface Library (or library). As such, each media-module may select a user interface template (e.g., menus, window) from the User Interface Library (or library) and subsequently fill (or populate it) with the appropriate information (e.g., menu items). In addition, the media-module can identify media-player(s) that can be used to present digital data associated with a media-component, and access information related to their media (e.g., music or movie list). However, the module-controller initiates the media-player associated with a media-component and subsequently forwards any input associated with presentation of media directly to the media-player for processing. As a result, the familiar look and feel of media-players can be preserved.

Embodiments of these aspects of the invention are discussed below with reference to FIGS. 1-4B. However, those skilled in the art will readily appreciate that the detailed description given herein with respect to these figures is for explanatory purposes as the invention extends beyond these limited embodiments.

FIG. 1 depicts a computing environment 100 capable of providing a multi-media-center in accordance with one embodiment of the invention. It will be appreciated that the multi-media-center can combine a plurality of media-components each including digital data and/or application(s) that can access digital data. The digital data associated with a media-component can be presented in one or more forms (e.g., display pictures, play music while displaying pictures, play a movie or a song). These media-components can be readily available and/or generally known (e.g., music player (e.g., iTunes), photo viewer (e.g., iPhoto), DVD player) or they can be developed for the multi-media-center. In general, each media-component includes digital data which can be presented in one or more forms and/or one or more application(s) (e.g., media-player) that can be used to manipulate digital data (e.g., present, organize, retrieve).

It will be appreciated that the computing environment 100 can provide a "central-user-interface" that can serve as a user interface for accessing all the media-components provided in the multi-media center. Referring now to FIG. 1, a main menu 104 displayed on a display 102 can be part of the central-user-interface for a multi-media center provided by the computing system 108. Furthermore, user input may be entered via an input device 106 (e.g., keyboard, mouse) connected to a computing system 108, and/or via a remote device 107 (e.g., remote controller, media-player with remote control capabilities) whether directly or via a network. The computing system 108 can, for example, be a computer, or a plurality of computers (e.g., a cluster). In general, the computing system 108 includes at least one processor and memory (not shown).

As depicted in FIG. 1, the main menu 104 can, for example, include a main menu-items ($M_1 \ldots M_n$) for each of the media-components provided by the multi-media center. Thus, a menu item $M_i$ in the main menu 104 can represent a media-component $M_i$. In addition, for each of the media-components ($M_1$-$M_n$) provided by the multi-media center, a media-module is configured in the computing system 108. This means that a media-module 110 is provided for media-component M represented in the main menu 104 ($M_1$) and available for access. Generally, the media-module 110 (M) can include the information needed to construct and display various menus (or submenus) for the media-component $M_i$. As such, if the media-component M is selected from the main menu, media-module 110 can provide a main (or base) menu for the media-component M. Similarly, the media-module 110 ($M_i$) can provide submenus for the media-component $M_i$ if its submenu is selected, and so on. It should be noted that the media-module 100 can obtain data from a local storage 116 or a remote storage 118 (e.g., database). Typically, the data pertains to the media-component M.

It will be appreciated that the modular design of the architecture demonstrated in FIG. 1 allows configuring a plurality of media-modules for various media-components. The media-module can provide a set of self-contained menus for a media-component. In addition, media-modules can be isolated from each other, so that they can be added or removed from the multi-media center without interfering with each other or a main program that controls the multi-media center.

In this modular design, the media-modules communicate with a multi-media-controller (or module-controller) 120. The multi-media-controller 120 can effectively control the centralized user interface (e.g., the menu displayed on display 102). The multi-media-controller (or module-controller) 120 can also serve as a central point for receiving input associated with the multi-media center (e.g., input received from the input 106, or remote device 107). More particularly, the multi-media-controller 120 can forward an input 122 to one of the media-modules ($M_1 \ldots M_n$), or to a media-player (or other applications) 112 that process the input in response to input 122. The media-modules ($M_1 \ldots M_n$) can generate output (e.g., menu, submenu, request to activate a media-player). As will be discussed in greater detail below, in some cases, the multi-media-controller 120 processes input 122 without forwarding it to a media-module or media-player(s) 121.

From an architectural perspective, it is important to note that the media-modules ($M_1 \ldots M_n$) do not directly control output (e.g., what is displayed on the display 102), but communicate with the multi-media-controller 120 which effectively controls output. However, output can be determined based on the processing or output provided or generated of the media-module. Typically, input is initially processed at a central location, namely, the multi-media-controller 120 which can route the input to the appropriate destination. Finally, media-modules ($M_1 \ldots M_n$) are typically isolated from each other and do not communicate with each other. Generally, the multi-media-controller 120 routes input to a media-module ($M_i$) if it can be handled by the media-module (e.g., input concerns a menu or additional information relating to a media-component). However, if a media-player (or other application) is to be activated or is currently presenting media, then the module-controller typically forwards the input to the media-player to affect the presentation of the media (or processing of media by an application program).

Figure 2A:
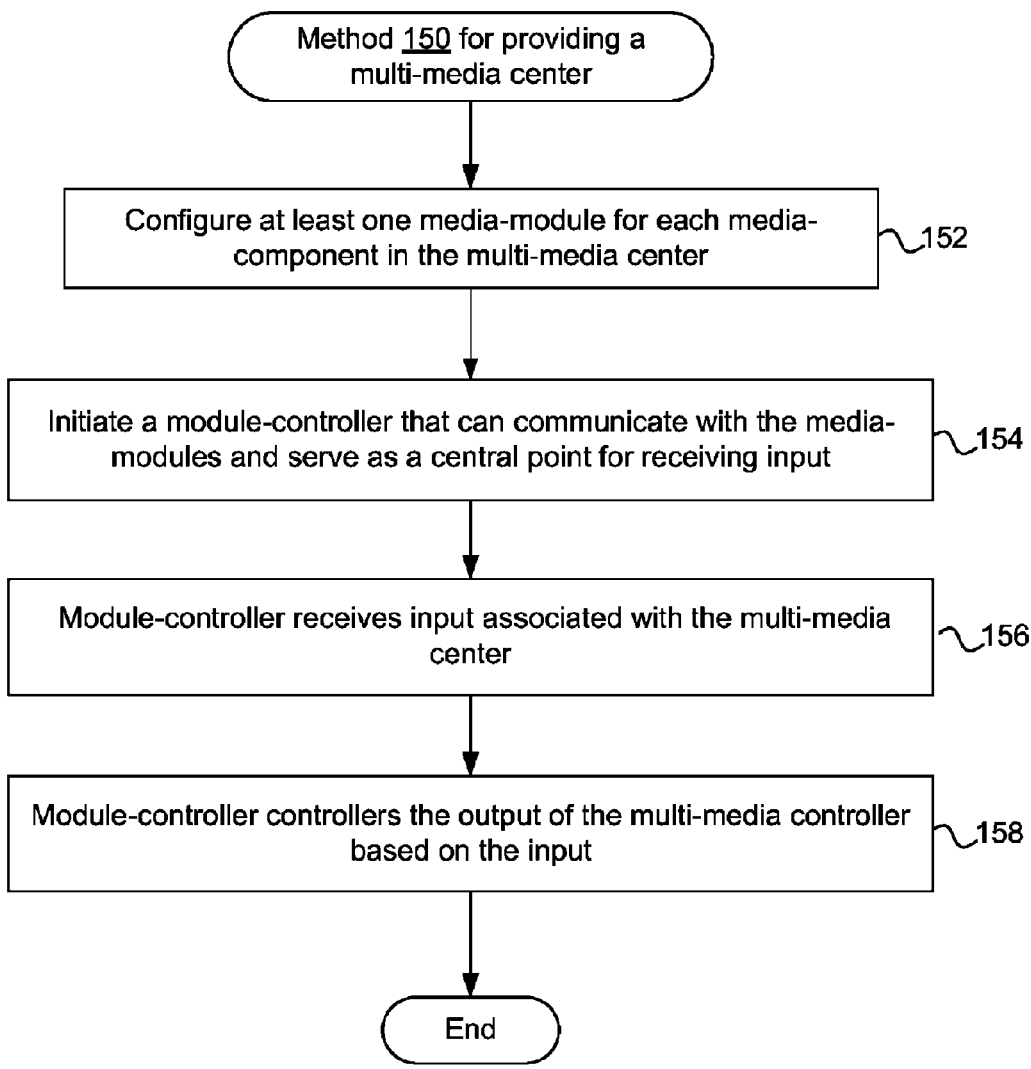
FIG. 2A depicts a method for providing a multi-media center in accordance with one embodiment of the invention.

FIG. 2A depicts a method 150 for providing a multi-media center in accordance with one embodiment of the invention. Initially, at least one media-module is configured (152) for each media-component provided by the multi-media center. A media-module represents a media-component and can, among other things, include and/or obtain information relating to a media-component (e.g., menus, lists of available items) and/or applications (e.g., media-players) related to the media-component.

Next, a central entity (e.g., a module-controller) is initiated (154) for the media-modules. The central entity (e.g., module-controller), among other things, can communicate with the media-modules and exchange information, for example, as input/output. In addition, the central entity (e.g., module-controller) can serve as a central point for receiving input. Accordingly, the central entity (e.g., module-controller) receives (156) input associated with the multi-media-controller. Finally, the central entity (e.g., module-controller) effectively controls (158) the output of the multi-media center based on the input. As will be discussed below, a central entity (e.g., module-controller) can effectively control the output of the multi-media cent, for example, by forwarding the input to a media-module and subsequently receiving output, by forwarding the input to an application program associated with the media-module and the media-component, or by effectively processing it internally or by an associated component (e.g., a main view media-module provided to control the main-view for the multi-media center).

Figure 2B:
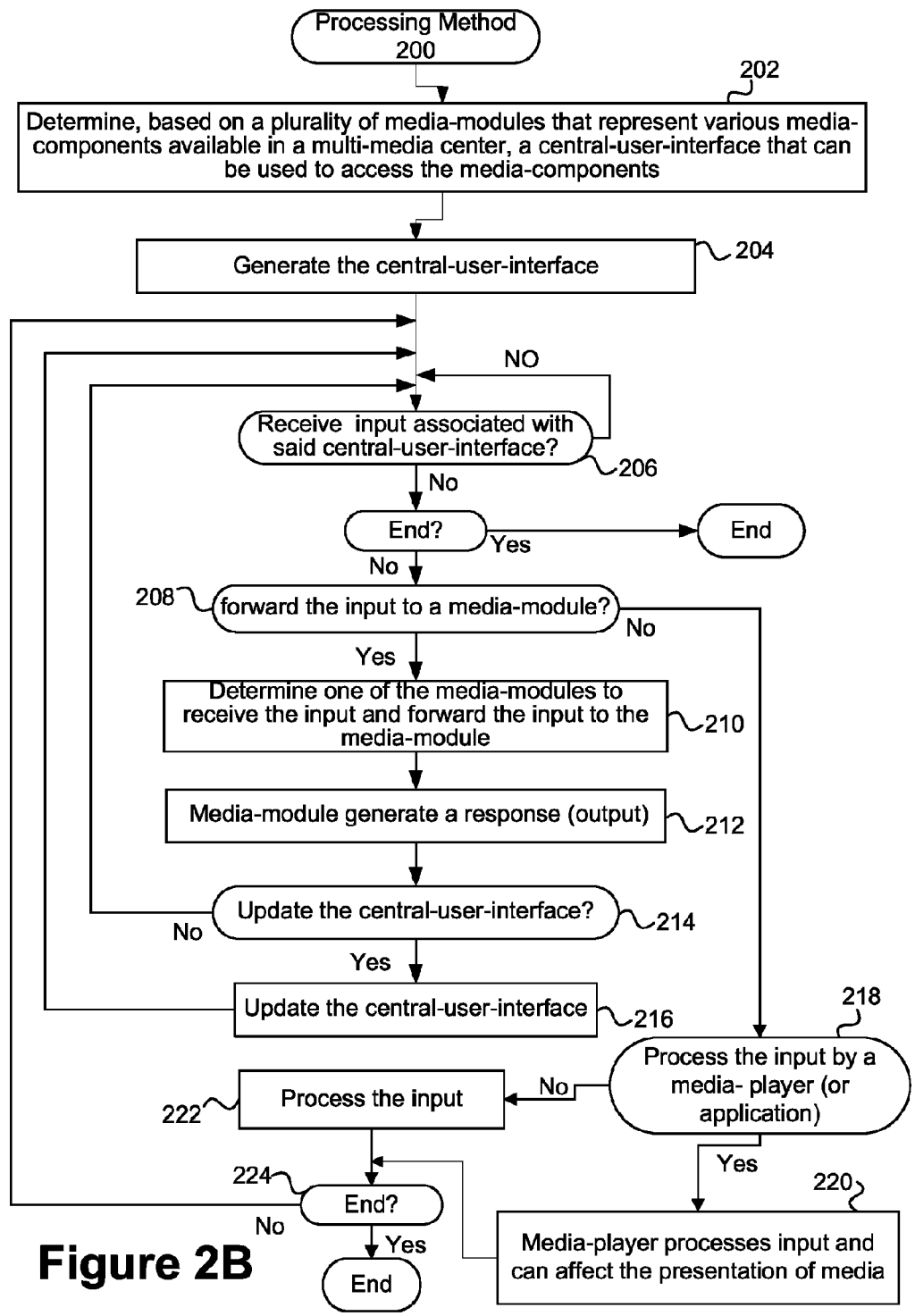
FIG. 2B depicts a method for processing input associated with a multi-media center in accordance with one embodiment of the invention.

To further elaborate, FIG. 2B depicts a method 200 for processing input associated with a multi-media center in accordance with one embodiment of the invention. The processing method 200 can, for example, be used by the multi-media-controller (or module-controller) 120 shown in FIG. 1. The multi-media center can, for example, be implemented as computer program. Initially, a central-user-interface that can be used to access a plurality of media-components is determined (202). It should be noted that the central-user-interface is determined based on a plurality of media-modules that represent various media-components configured (i.e., available) in the multi-media center. Accordingly, the central-user-interface is generated (204) based on the media-modules. Next, it is determined (206) whether input associated with the central-user-interface is received. If it is determined (206) that input is received and the input does not indicate to end the multi-media center, it is determined (208) whether to forward the input to one of the media-modules configured for the multi-media center. If it is determined (208) to forward the input to one of the media-modules, a media-module that is to receive the input is determined and the input is forwarded (210) to the media-module. Thereafter, a response (e.g., output) is generated (212) by the media-module. After the processing of the input by the media-module, it is determined (214) whether to update the central-user-interface based on the response generated by the media-module. Accordingly, the central-user-interface can be updated (216). Subsequently, it can be determined (206) whether input associated with the central-user-interface is received and the processing method 200 can proceed in a similar manner as discussed above. However, if it is determined (214) not to update the central-user-interface, it is determined (206) whether input associated with the central-user-interface is received without updating (216) the central-user-interface. Thereafter, the method 200 proceeds in a similar manner as discussed above.

On the other hand, if it is determined (208) not to process the input by a media-module, it is determined (218) whether to process the input by a media-player (or an application). Accordingly, the input can be processed (220) by the media-player and the media-player may affect the presentation of media based on the input. Thereafter, it is determined (222) whether to end the multi-media center and the method 200 can end. Otherwise, it can be determined (206) whether input associated with the central-user-interface is received and the method 200 proceeds in a similar manner as discussed above.

If it is determined (218) not to process the input by a media-player (or application), the input is processed (222) internally (e.g., by a media-controller) or another component of the multi-media center (e.g., by a main window component that processes input associated with a main menu of the multi-media center). Subsequently, it is determined (224) whether to end the multi-media center (e.g., terminate the computer program) and the method 200 can end accordingly. Otherwise, it is determined (206) whether input associated with the multi-media center is received and the method 200 proceeds as discussed above until an input indicates to end the multi-media center.

Figure 3:
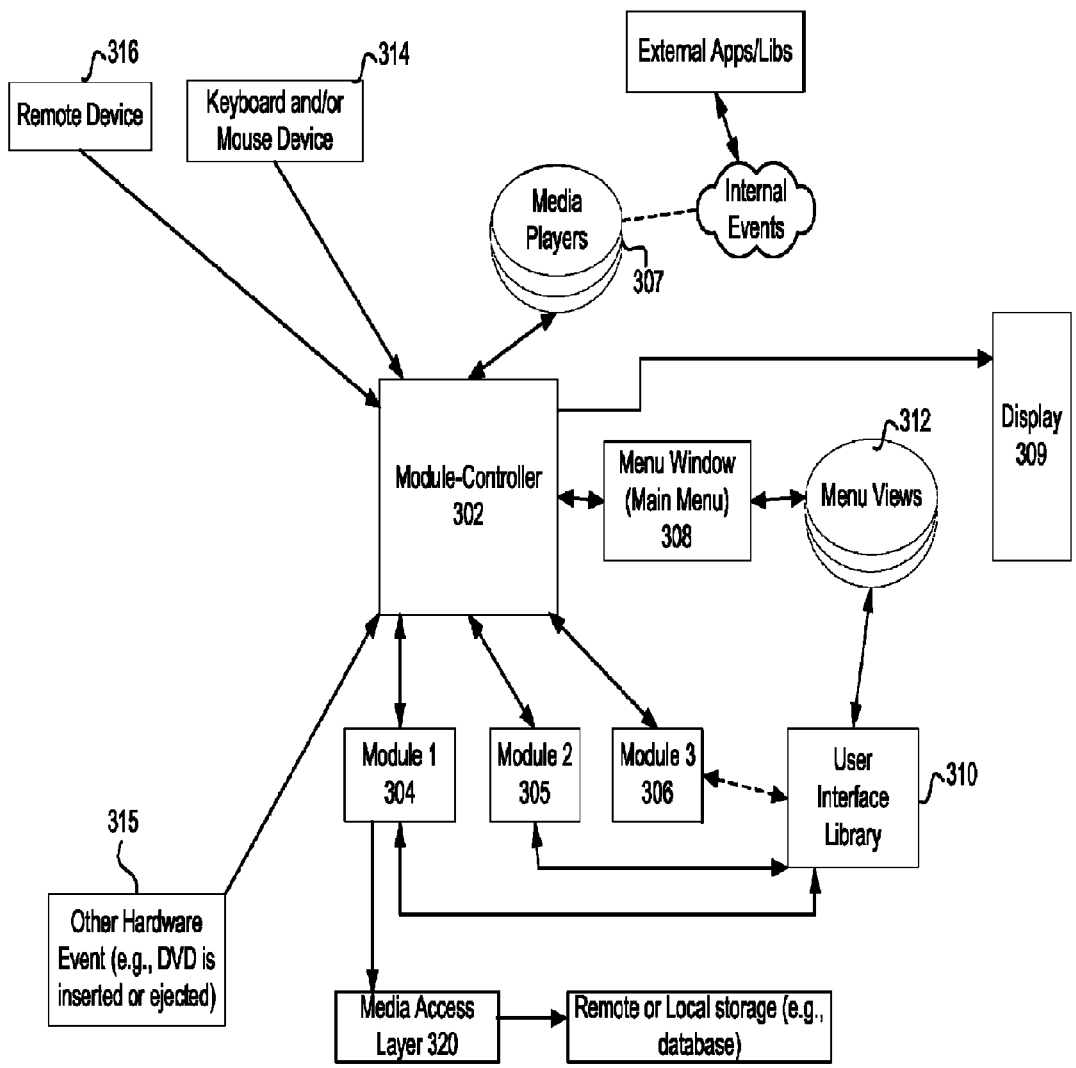
FIG. 3 depicts in greater detail an architectural view for a multi-media center program that can provide access to multiple media-components via a central-user-interface in accordance with one embodiment of the invention.

FIG. 3 depicts in greater detail an architectural view for a multi-media center that allows users to access multiple media-components by interfacing with a central-user-interface in accordance with one embodiment of the invention. As shown in FIG. 3, in addition to a number of media-modules (304, 305, 306) and media-players 307, a module-controller 302 can communicate with a menu-window 308 and a User Interface Library (library) 310. It should be noted that the module-controller 302 can receive input (e.g., as events) from a keyboard and/or mouse 314, a remote device 316, or other hardware input 315 (e.g., DVD is inserted or ejected).

The menu-window 308 effectively controls menus displayed on the display 309. In addition, it can maintain and store menus using menu-views 312. The menu-views 312 effectively implements a stack of menu-views to keep track of what has been displayed on the display 309. Thus menu-views 312 can be added or removed from the stack as the user traverses up and down between various menus or submenus of a particular media-components or between main menu items of the multi-media center representing different media-components, and so on. As will be appreciated, menus and submenus can be created using a User Interface Library (library) 310. More particularly, when the module-controller 302 receives an input, for example, pertaining to a menu item associated with a particular media-component, the module-controller 302 can request that the media-module "post" the appropriate menu to make this request. The module-controller 302 can, for example, forward the input to a particular media-module. The media-module then, uses the User Interface Library (library) 310 to obtain an appropriate theme (or template) and then uses the theme from the User Interface Library (library) 310 to generate the appropriate menu (i.e., effectively fills out a template with its information). It should also be noted that a media-module 304 can also use a media access layer 320 to access data (e.g., list of songs, movies), for example, from a database associated with a media-component (iTunes) that stores information about the media-component. In any case, menus and/or other data generated and/or obtained by a media-module can be forwarded to the module-controller 302 which can in turn provide it to the menu-window 308.

To further elaborate, initialization of the module-controller 302 will be discussed now. Initially, an initial-event signifying the start of the multi-media center program is received. This initial-event can be input by a keyboard and/or mouse 314 or a remote device 316. In any case, in response to the initial-event, the module-controller 302 is initiated. The module-controller 302 effectively determines what media-modules are currently configured, as media-modules may be dynamically added or removed from the configuration (e.g., a media-module 306 may be added or removed without affecting other media-modules). In one embodiment of the invention, each media-module sends its initial data (icon and name) to the module-controller 302. The module-controller 302 sends the initial data (icons and names) to the menu-window 308 which generates a main menu including the initial data (icons and name) generated by the media-modules. The menu-window 308 can use the User Interface Library (library) 310 to generate the main menu for the multi-media center and facilitate displaying it on the display 309.

After the main menu for the multi-media center is generated and displayed, the module-controller 302 can wait for user input (i.e., input received from a user, for example, a human, or application program). If the input pertains to manipulation of the main menu for the multi-media center (e.g., rotation of a carrousel), then the module-controller 302 can forward it to the menu-window 308 which is capable of processing it to effectively manipulate the main menu displayed on display 309 for the multi-media center (e.g., rotate a carrousel that represents the main menu). If user input, however, pertains to a particular media-module (e.g., selection of a particular media-module from the main menu of the multi-media center), the menu-window 308 does not process it even if the module-controller 302 initially sends the input to the menu-window 308. Instead, the menu-window 308 can determine which media-module is to process the input. This determination can, for example, be made based on which menu or menu item is currently displayed or is effectively on top of the menu-views 312. The media-module associated with the menu can then be identified and forwarded to the module-controller 302.

Subsequently, the module-controller 302 can forward the user input to the appropriate media-module for processing. It is likely that the input associated with a media-module initially pertains to a main (or base) menu for the media-component represented by the media-module. The media-module can access the User Interface Library (library) 310 to get an appropriate theme (or template) for its base menu. In one embodiment, a set of menus including a standard menu and an accessorized menu are provided. The media-module can select a standard menu which includes a list of items, or an accessorized menu that additionally includes a preview screen. These Menus are also described in U.S. Provisional Patent Application No. 60/725,544, filed Oct. 10, 2005, and entitled "MULTIMEDIA CONTROL CENTER".

In any case, the media-module can obtain a template for a menu and subsequently fill (or populate) it with data (e.g., menu items). Subsequently the media-module can send its filled out menu to the module-controller 302 which can, in turn, send it to menu-window 308. The menu-window 308 effectively displays the menu by pushing it on the menu-views 312. In this way, a main (or base) menu for a particular media-component can be displayed in response to a selection made from the main menu of the multi-media center.

When user input pertains to the main menu of the multi-media center, it can be handled by the menu-window 308. More particularly, the input initially received by the module-controller 302 is forwarded to the menu-window 308. The menu-window 308 recognizes the input and it can effectively process the input and communicate it to the module-controller 302. However, the module-controller 302 may actually control the display, for example, by manipulating the main menu displayed for the multi-media center (e.g., rotates the main menu). However, if input pertains to a particular media-module (e.g., selection of a particular media-component), the input can be handled by the media-module. More particularly, the media-module can access the User Interface Library (library) 310 and construct another menu (or submenu) in a similar manner as discussed above. The constructed menu can then be sent to module-controller 302 which sends it to the menu-window 308.

It should be noted that in addition to generating a menu (or submenu), a media-module can effectively ask the module-controller 302 to initiate a media-player (307). More particularly, when a user selects, for example, a menu item that is associated with presenting media (e.g., play music, play film, show photo, slideshow), user input is received by the module-controller 302. The module-controller 302 can initially forward the input to the menu-window 308, but the menu-window 308 would not process the input as it does not pertain to manipulation of the main menu. Instead, the menu-window 308 effectively asks the module-controller 302 to forward the input to the appropriate media-module. In addition, the menu-window 308 can effectively identify the media-module that should process the input because it can determine which menu-view is the top (or most-front) menu and identify its associated media-module. In other words, menu-window 308 can determine which media-module's menu (or submenu) is currently being displayed and let the module-controller 302 know which media-module should process the input.

In addition to constructing menus, the media-module can perform other functions. By way of example, when user input associated with presentation of media is forwarded by the module-controller 302 to a media-module 304, the media-module 304 can identify the input as a request for presentation of media of its associated media-component. As a result, the media-module 304 identifies a media-player (307) to be initiated. Subsequently, the module-controller 302 initiates the media-player (307) which effectively results in presentation of media on display 309 and/or other devices (e.g., speakers). It should be noted that when a media-player is initiated, the media-module 304 does not directly communicate with the media-player. Furthermore, as long as the media-player is active (i.e., presenting media), the module-controller 302 sends input directly to media-player (307) for processing. It will be appreciated that various media-players readily available and/or familiar to the users can be used. In addition, the familiar look and feel of media-players can be preserved. It is possible to have a media-player (e.g., music player) present media (e.g., music) in the background while another media-player presents media (e.g., displays photos or a slideshow). It should also be noted that it is possible to use a virtual stack (307) to keep track of usage of the media-players. Hence, when an active media-player terminates, the media-player is effectively popped from the virtual stack (307).

Figure 4A:
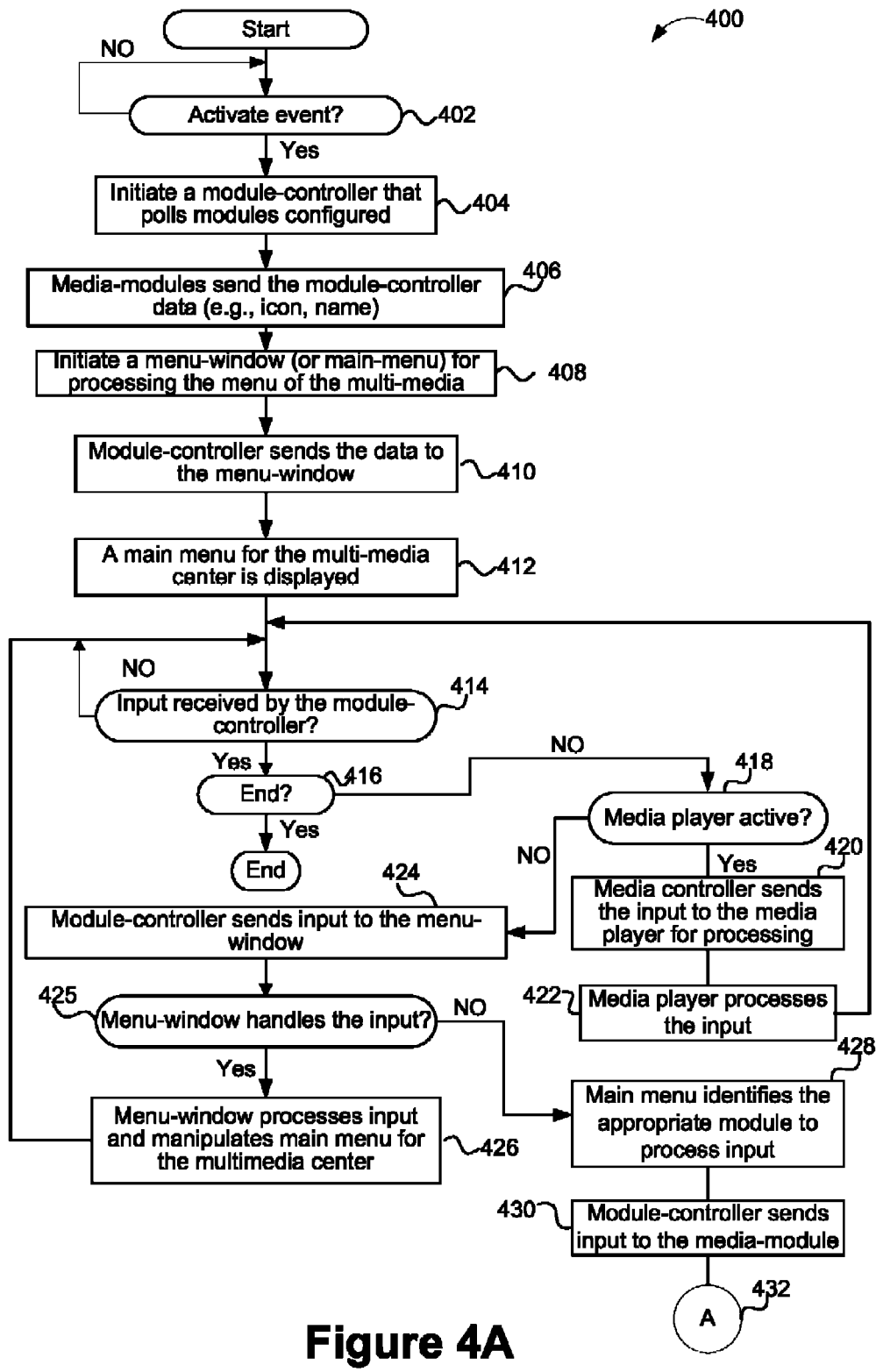
FIGS. 4A-4B depict a method for providing a multi-media center which can be accessed to a central-user-interface in accordance with another embodiment of the invention.
Figure 4B:
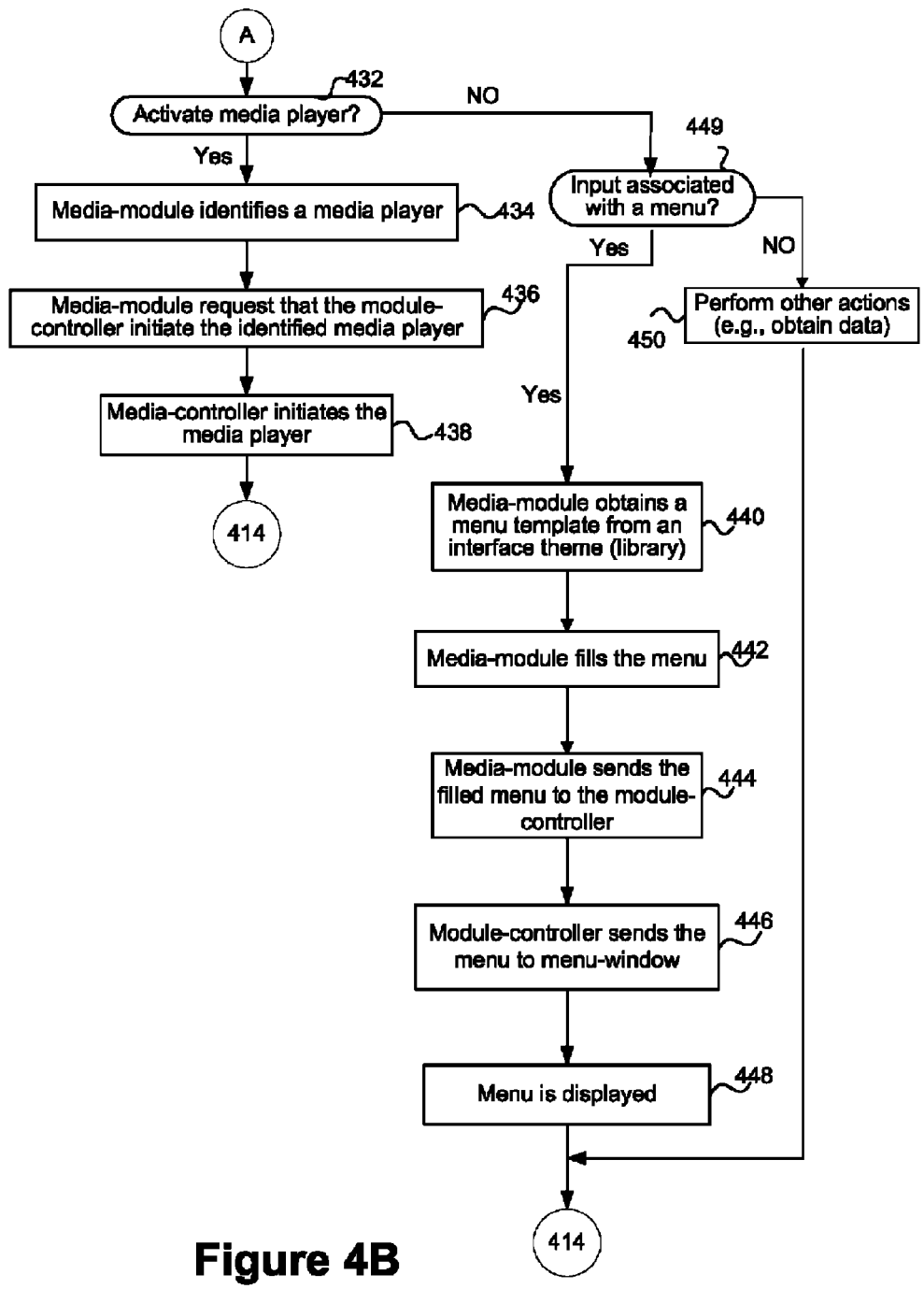

FIGS. 4A-4B depict a method 400 for providing a multi-media center which can be accessed via a central-user-interface in accordance with another embodiment of the invention.

Initially, it is determined (402) whether an activation event is received. If it is determined (402) that an activation event is received, a module-controller is initiated (404). The module-controller effectively polls the media-modules which have been configured for the multi-media center for their initial data (e.g., name of the media-module and icon). Accordingly, the media-modules send the module-controller initial data typically pertaining to their main menu for the multi-media center. As noted above, this data can, for example, include an icon and name for each of the media-modules. Thereafter, a menu window can be initiated (408). Subsequently, the module-controller sends the menu window the initial data. Thereafter, the menu window displays (412) a main menu for the multi-media center 412. After the menu window is displayed, the module-controller effectively awaits (414) input. Assuming that the input does not indicate (416) to terminate the multi-media center, it is determined (418) whether a media-player is active. If it is determined (418) that a media-player is active, the module-controller sends (420) the input to the appropriate media-player for processing and the media-player processes (422) the input accordingly. Subsequently, it can be determined (414) by the module-controller whether input is received.

However, if it is determined (418) that a media-player is not active, the module-controller sends (424) the input to the menu window. The menu window can then determine (425) whether to handle the input. If the menu window determines (425) to handle the input, the menu window processes (426) the input. As a result, a main menu displayed for the multi-media center can be manipulated (426). Thereafter, the module-controller determines (414) whether input has been received and the method 400 proceeds in a similar manner as discussed above.

On the other hand, if it is determined (425) that the menu window cannot handle the input, the main window identifies (428) the appropriate media-module to process the input. Subsequently, the module-controller sends (430) the input to the identified media-module.

Next, referring to FIG. 4B, the media-module determines (432) whether to activate a media-player in response to the input. If it is determined (432) by the media-module to activate a media-player, the media-module identifies (434) a media-player and requests (436) from the module-controller to initiate the identified media-player. As a result, the module-controller initiates (438) the media-player. Thereafter, it can be determined (414) by the module-controller whether the input is received, and method 400 proceeds in the similar manner as discussed above.

On the other hand, if the media-module determines (432) not to activate a media-player, the input is directed to a menu (or other data) related to the media-component. Although other functions including obtaining (450) data can be performed by the media-module, for brevity, only construction of a menu is depicted in greater detail. Consequently, if it is determined (449) that the input is associated with a menu, the media-module obtains (440) a menu template from an User Interface Library (library). Subsequently, the media-module fills (442) the menu and sends (444) the filled menu to the module-controller. The module-controller sends (446) the menu to the menu-window. As a result, the appropriate menu is displayed (448) in response to the input received (414) by the media-controller. Thereafter, it is determined by the media-controller (414) whether the input is received, and the method 400 proceeds in the similar manner as discussed above until it is determined (416) to end the method 400 and effectively terminate the multi-media center.

Those skilled in the art will know that media-modules can be designed as computer program modules that can be "plugged" in or removed from a main multi-media center application program. As such, media-modules may post all requests through a module-controller. In addition, media-modules can use user interface classes and widgets provided in a user interface library, and access data via a media access layer. Media-modules can provide one or more of the following functions: provide a media-module identifier "key," provide a main (or base) menu, have the ability to respond to input corresponding to a selection of one of the items listed in their main (or base) menu, provide a name and/or icon image for the media-component they represent. The media-module may also provide other functions including saving or restoring states associated with a database, playing a sound, and phrase presentation of an associated media-player.

Those skilled in the art will also appreciate that a module-controller can function as traffic manager. It can instantiate and keep track of media-modules, route events associated with user input, control what is displayed. A user interface library can include metric utilities, windows and views, widgets, and sounds. The metric utilities can be implemented as a set of C programming calls that provide various layout metrics, including screen frames, the menu frames, and text attributes. Windows and views can include a collection of classes that define the layout and behavior of windows and views. Widgets can include a set of interface widgets that can be used by the media-module or window or views. Finally, the user interface library can also provide hooks to play sounds that can be played for various user actions. The sounds can be played via a standard C calls.

The invention has many advantages. An embodiment of the invention can include one or more of these advantages. One advantage of the invention is that various types of digital data and applications used to present digital data can be accessed from a user interface. Another advantage of the invention is that various types of digital data and applications can be added or removed dynamically. Yet another advantage of the invention is that it is possible to use a standard user interface library for various types of digital data and applications. Still another advantage of the invention is that it is possible to use and preserve the look and feel of more popular media-players.

The many features and advantages of the present invention are apparent from the written description, and thus, it is intended by the appended claims to cover all such features and advantages of the invention. Further, since numerous modifications and changes will readily occur to those skilled.

What is claimed is:

1. A method for providing a multi-media center for presenting digital data, the method comprising:
   configuring a plurality of media-modules to represent media-components available for access within the multi-media center, the configuring including associating each of the plurality of media-modules with one of a plurality of media-components, and each of the plurality of media-components including at least one of digital media and an application program configured to access digital media, wherein each of the plurality of media-modules controls access to operations associated with its associated media-component by processing received inputs;
   initiating a module-controller configured to communicate with each of the plurality of media-modules, the initiating including requesting a set of initial data for each of the plurality of media-modules, the set of initial data representing an icon and a name for media-components associated with each of the plurality of media-modules;
   transmitting the set of initial data for each of the plurality of media-modules to a menu-window, the menu-window generating a main menu for the multi-media center including at least the set of initial data for each of the plurality of media-modules; and
   displaying the main menu for the multi-media center on a display.

2. The method of claim 1, wherein generating the main menu for the multi-media center includes:
   accessing a user interface library to obtain a main menu template; and
   populating the main menu template to generate the main menu.

3. The method of claim 1, wherein the plurality of media-modules do not directly communicate with each other, and wherein the plurality of media-modules can be dynamically removed or added to the multi-media center.

4. The method of claim 1, further comprising:
   receiving an input and forwarding the input to one of the plurality of media-modules for processing.

5. The method of claim 1, further comprising:
   receiving an input and forwarding the input to the application program associated with one of the plurality of media-modules for processing.

6. The method of claim 1, further comprising:
   receiving an input to modify the displaying of the main menu for the multi-media center; and
   forwarding the input to the menu-window for processing and modifying the displaying of the main menu for the multi-media center.

7. The method of claim 1, further comprising:
   receiving an input;
   determining that a media-player is active; and
   forwarding the input to the media-player for processing.

8. A method for accessing media-components of a multi-media center, the method comprising:
   receiving, at a module-controller, an input to navigate a menu-window of the multi-media center, the menu-window implementing a stack of menu-views tracking a plurality of menus displayed on a display, wherein a menu positioned at a top of the stack of menu-views is currently displayed;
   determining whether to forward the input to one of the plurality of media-modules for processing, the determining based at least in part on the menu positioned at the top of the stack of menu-views;
   identifying a media-module associated with the menu positioned at the top of the stack of menu-views, the media-module representing media-components available for access within the multi-media center, wherein the media-module controls access to operations associated with its associated media-component by processing received inputs;
   forwarding the input to the media-module for processing; and
   receiving, at the module-controller, a response to the input generated by the media-module.

9. The method of claim 8, wherein the plurality of menus represent at least one of a menu-window main menu, a media-component menu, and a media-component submenu.

10. The method of claim 8, wherein receiving the input to navigate the menu-window comprises:
    receiving an input pertaining to a menu item associated with a particular media-component represented by a particular media-module; and
    requesting the particular media-module provide an appropriate menu.

11. The method of claim 10, further comprising:
forwarding the input pertaining to the menu item to the particular media-module for processing.

12. The method of claim 8, wherein the processing at the media-module includes obtaining a menu template from a user interface library.

13. The method of claim 12, further comprising:
populating the menu template; and
returning the populated menu template, as the response to the input, to the module-controller.

14. The method of claim 13, further comprising:
transmitting the populated menu template to the menu-window; and
positioning the populated menu template at the top of the stack of menu-views for displaying on the display.

15. The method of claim 13, wherein populating the menu template generates at least one of a media-component menu or a media-component submenu.

16. The method of claim 8, wherein removing the menu positioned at the top of the stack of menu-views causes a next menu positioned in the stack of menu-views to be displayed.

17. The method of claim 8, further comprising:
updating the menu-window of the multi-media center based on the response to the input generated by the media-module.

18. The method of claim 8, further comprising:
identifying, at the media-module, that the input is a request for presentation of media from a media-component represented by the media-module; and
identifying a media-player to be initiated.

19. The method of claim 18, further comprising:
initiating the media-player; and
presenting the media from the media-component represented by the media-module on the display.

20. The method of claim 19, further comprising:
receiving, at the module-controller, a subsequent input while the media-player is initiated; and
forwarding the subsequent input from the module-controller to the media-player for processing.

21. A non-transitory computer-readable medium for providing a multi-media center for presenting digital data, the computer-readable medium comprising computer program logic recorded thereon for:
configuring a plurality of media-modules to represent media-components available for access within the multi-media center, the configuring including associating each of the plurality of media-modules with one of a plurality of media-components, and each of the plurality of media-components including at least one of digital media and an application program configured to access digital media; wherein each of the plurality of media-modules controls access to operations associated with its associated media-component by processing received inputs;
initiating a module-controller configured to communicate with each of the plurality of media-modules, the initiating including requesting a set of initial data for each of the plurality of media-modules, the set of initial data representing an icon and a name for media-components associated with each of the plurality of media-modules;
transmitting the set of initial data for each of the plurality of media-modules to a menu-window, the menu-window generating a main menu for the multi-media center including at least the set of initial data for each of the plurality of media-modules; and
displaying the main menu for the multi-media center on a display.

22. A non-transitory computer-readable medium for accessing media-components of a multi-media center, the computer-readable medium comprising computer program logic recorded thereon for:
receiving, at a module-controller, an input to navigate a menu-window of the multi-media center, the menu-window implementing a stack of menu-views tracking a plurality of menus displayed on a display, wherein a menu positioned at a top of the stack of menu-views is currently displayed;
determining whether to forward the input to one of the plurality of media-modules for processing, the determining based at least in part on the menu positioned at the top of the stack of menu-views;
identifying a media-module associated with the menu positioned at the top of the stack of menu-views, the media-module representing media-components available for access within the multi-media center, wherein the media-module controls access to operations associated with its associated media-component by processing received inputs;
forwarding the input to the media-module for processing; and
receiving, at the module-controller, a response to the input generated by the media-module.

* * * * *